Dec. 9, 1969 J. RABINOW 3,483,511

READING MACHINE FOR SELECTIVELY ORIENTED PRINTED MATTER

Filed Oct. 22, 1965 2 Sheets-Sheet 1

INVENTOR
Jacob Rabinow

BY Joseph A. Genovese

ATTORNEY

Dec. 9, 1969 J. RABINOW 3,483,511

READING MACHINE FOR SELECTIVELY ORIENTED PRINTED MATTER

Filed Oct. 22, 1965 2 Sheets-Sheet 2

INVENTOR
Jacob Rabinow

BY Joseph A. Genovese
ATTORNEY

United States Patent Office 3,483,511

Patented Dec. 9, 1969

3,483,511

READING MACHINE FOR SELECTIVELY ORIENTED PRINTED MATTER

Jacob Rabinow, Bethesda, Md., assignor to Control Data Corporation, Rockville, Md.

Filed Oct. 22, 1965, Ser. No. 500,981
Int. Cl. G06k 9/02
U.S. Cl. 340—146.3 11 Claims

ABSTRACT OF THE DISCLOSURE

An optical character reading machine capable of full reading efficiency in a page reading mode and also in a document reading mode where the line of print is moved at right angles to the motion of the lines of print of a page in the former reading mode. Either simple optical or electronic or mechanical means orient the images (or their video signals) to compensate for the print orientation difference in the two reading modes to enable the machine to read in either mode without altering the central logic of the reading machine.

This invention relates to reading machines and, particularly, to increasing the versatility of optical character reading machines.

There are available optical character reading machines which are designed specifically for either one or the other of two major functions. These are for reading pages or for reading single-line documents. A page reader has the capability of identifying the characters of a page of printed material line by line, one after the other. On the other hand, single line reading machines are specially designed to handle documents containing only one, or a few lines in a more efficient manner.

In order to avoid confusion, the differences, as used herein, between a "page" of printed material, a "document," and a "sheet" are explained below. As the term "page" is used, it is intended to mean an ordinary page of typewritten material, printed material, etc., or a continuous web folded upon itself, such as "Fanfold," tally-rolls, cash register strips, and the like. A "document," as used herein, is somewhat synonymous with "turnaround" documents in that it means any sheet containing one, two, or a few lines of characters. Examples of such documents are merchandise and/or inventory tags, labels, utility bills, receipts, bills formed by credit card impressions, and others. Of the last mentioned examples, certain are "turnaround" documents and others are not. A "turnaround" document is one which is returned to the originator (e.g. a utility bill). The term "sheet" is defined as the carrier for the characters. The sheet can be made of any material suitable for the purpose, such as paper, card stock, plastic, metal in some instances, and others.

There are good reasons why document and page reading functions are not readily interchangeable. In a typical page reading machine, the sheet mover moves the page into position, and a mirror, or equivalent, optically sweeps images of the characters of the first line of characters over the scanner, or vice versa. The page is stepped, or synchronously moved, a discrete distance equal to the line spacing, and images of the characters of the second line are similarly swept across the scanner. This procedure must be repeated at least once for each line of characters on the page. Note particularly that one component of scan motion is obtained by a mirror, or the like, which optically sweeps lengthwise over the lines of characters. I realize that many variations of page reading systems have been proposed, and that the above is merely typical.

In a single line reading machine, there are ordinarily no such stopping and/or stepping of the document. There are no means corresponding to the sweeping function of the mirror mentioned above. One component of scan motion is obtained by the motion of the document, i.e. it is "read on the fly."

Reading machines designed for pages are inefficiently used to identify the characters of a document. The worse situation is the converse. Reading machines for documents cannot be used as page readers because they have no capacity to read more than one, or at best, no more than a few lines.

An object of my invention is to provide a system which effectively dissolves the commercially accepted distinction between the above two general classes of reading machines. More particularly, my invention provides a reading machine capable of operating at peak design efficiency as a page reader and selectively, as a document reading machine with an efficiency at least equivalent to the respective efficiencies of machines designed exclusively and respectively as a page reading machine and as a document reading machine.

An important feature of this invention is that the above is accomplished in an exceedingly simple manner by requiring certain machine components to operate in a dual capacity.

In order to obtain a better understanding of the practical difficulties involved in attempting to use commercially available reading machines with sheets whose printed material is in a format other than that for which the machine is designed, consider the operation of a typical page reading machine. One commercially available machine (Control Data Corporation–915 Page Reader) has a sheet mover which moves a page into the reading station and brings it to rest. The orientation of the page is such that the lines of print are transverse to the direction of feed motion of the page. One line of characters after the other is then successively imaged on a scanner by a sweeping mirror of the machine optical system. So that the lines are imaged successively, the page is stepped in small increments in synchronism with (after) the reading of each line. Although the above machine is capable of identifying six lines of characters per second when presented to the optical system in the above way, the stopping of the page, positioning of the page, "finding" of the first line by the optical system, etc. consume a large fraction of the total time. If a single line document were presented to the optical system of that reading machine in a manner identical to the presentation of a page, the reading machine would be capable of identifying the characters of a single line document at the rate of only slightly greater than one document per second.

On the other hand, my invention contemplates the feeding of a document end-wise (with the line of characters parallel to the direction of motion of the document rather than transverse to it as in the case of feeding a page). By means described later, the same page reading machine modified in accordance with my invention, is capable of identifying all of the characters on at least six documents per second instead of only one document per second, which would be the case if the Page Reader were unmodified and used to read documents. In accomplishing this, I take advantage of the saving in time by having the single-line documents continuously fed through the reading machine in optical alignment with the optics of the reading machine, rather than moving the document (as a page) into the reading station, stopping it, "finding" the line, and then stepping it through the reading station.

The above procedure is not without some difficulty due to the orientation of the characters. As a document reader, the characters are rotated 90° and they move in a different direction from that for which the Page Reader is designed. To explain by analogy, when a human being reads a page of printed material, the characters are oriented "upward" and the eyes of the reader move from the left end of the first line, to the right end thereof, retrace quickly without reading, and then from the left end of the second line to the right end thereof, and so forth. This corresponds to a page reading machine identifying characters in the first line during a sweep of the optics, and then stepping the page a short distance during retrace so that the reader optics can again sweep from left to right over the second line, etc. However, as a single line document is handled by the reading machine modified in accordance with my invention, the single line of characters will be fed end-wise through the reading stations. This means that each of the characters are rotated 90° from the orientation of the characters on a page, and that the page image is moving "up-to-down," rather than "left-to-right." My invention overcomes this difficulty by optical means which orient the character images in a manner such that the scanner of the reading machine experiences character images in the same orientation and direction of motion regardless of whether the printed material on the sheet is presented in page form as described before, or in document form as described herein.

Accordingly, another object of this invention is to provide a reading machine with selectively usable optical means by which the images of characters experienced by the scanner of the machine are in the same relative orientation regardless of whether the printed character presented to the reading station are oriented in one direction or in another direction transverse thereto.

In accordance with certain forms of my invention, the above objective is achieved by entirely optical means. In another form, the means involved are mechanical. However, it is possible to fulfill the ends of my invention by electrical and/or electronic means. In another embodiment I have a partially electronic and partially optical system by which the ultimate processing of data within the machine (as opposed to the scanner) is made oblivious to the orientation and direction of characters in the reading station of the machine (page or document reading modes).

Accordingly, another object of my invention is to provide an improvement for a reading machine by which the machine can be efficiently used for either (or both) page or document reading as defined herein, with an inordinately simple optical and/or electronic modification of or to an otherwise conventional reading machine.

A further object of the invention is to provide a reading machine capable of utilizing the full speed-capacity and capability thereof as a one or two line document reader and yet, having the capability of a page reading machine.

Other objects and features of importance will become apparent in following the description of the illustrated forms of the invention which are given by way of example.

Figures 3, 3A, 4, 4A, 5:
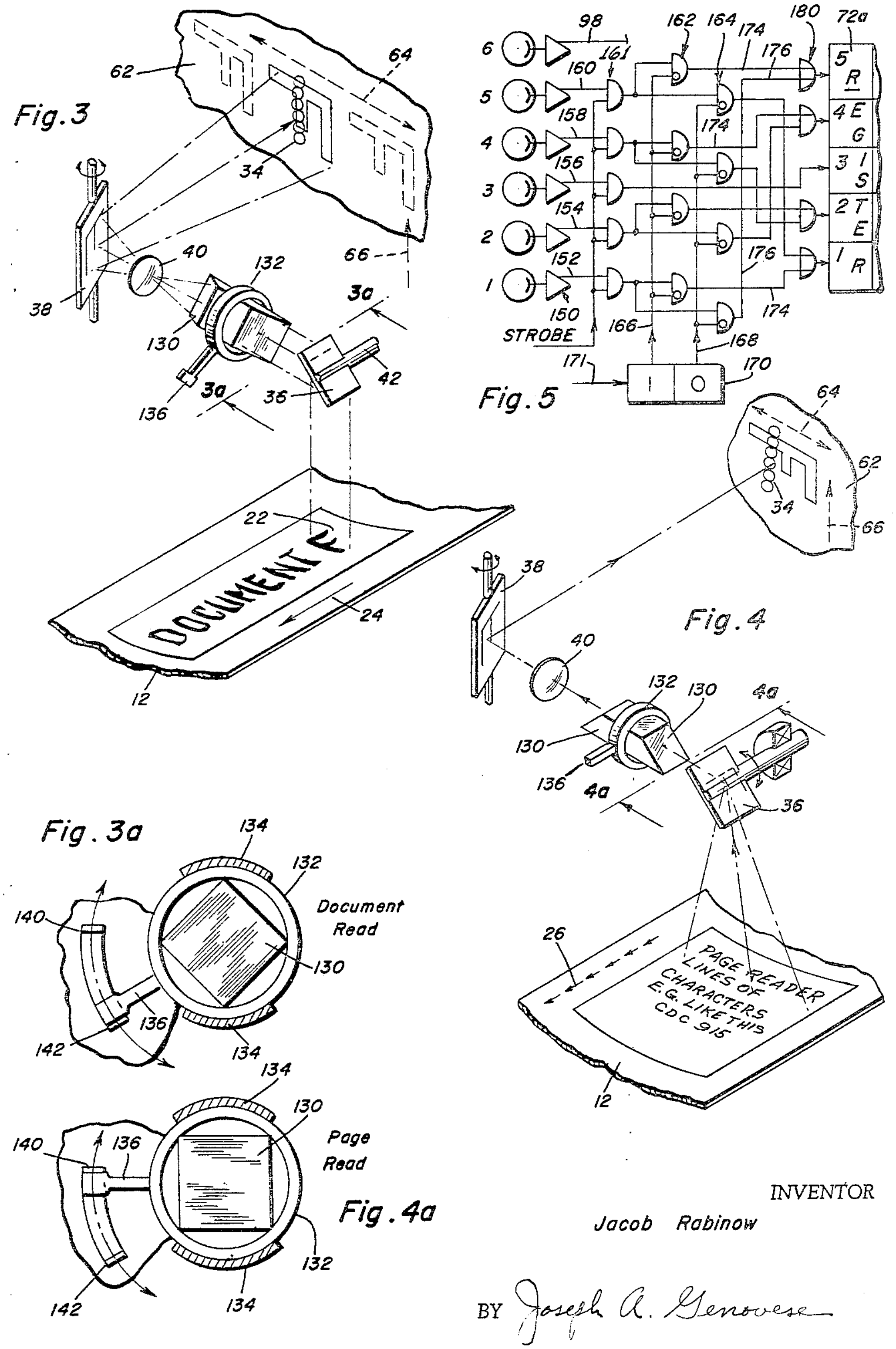
FIGURE 3 is a schematic perspective view of another embodiment of the invention with the machine shown in the document reading mode.

FIGURE 3*a* is an enlarged view taken on the line 3*a*—3*a* of FIGURE 3.

FIGURE 4 is a schematic view similar to FIGURE 3, with the machine shown adjusted for a page reading task.

FIGURE 4*a* is a view taken on the line 4*a*—4*a* of FIGURE 4.

FIGURE 5 is a fragmentary view showing another form of my invention.

Figures 1, 2, 6:
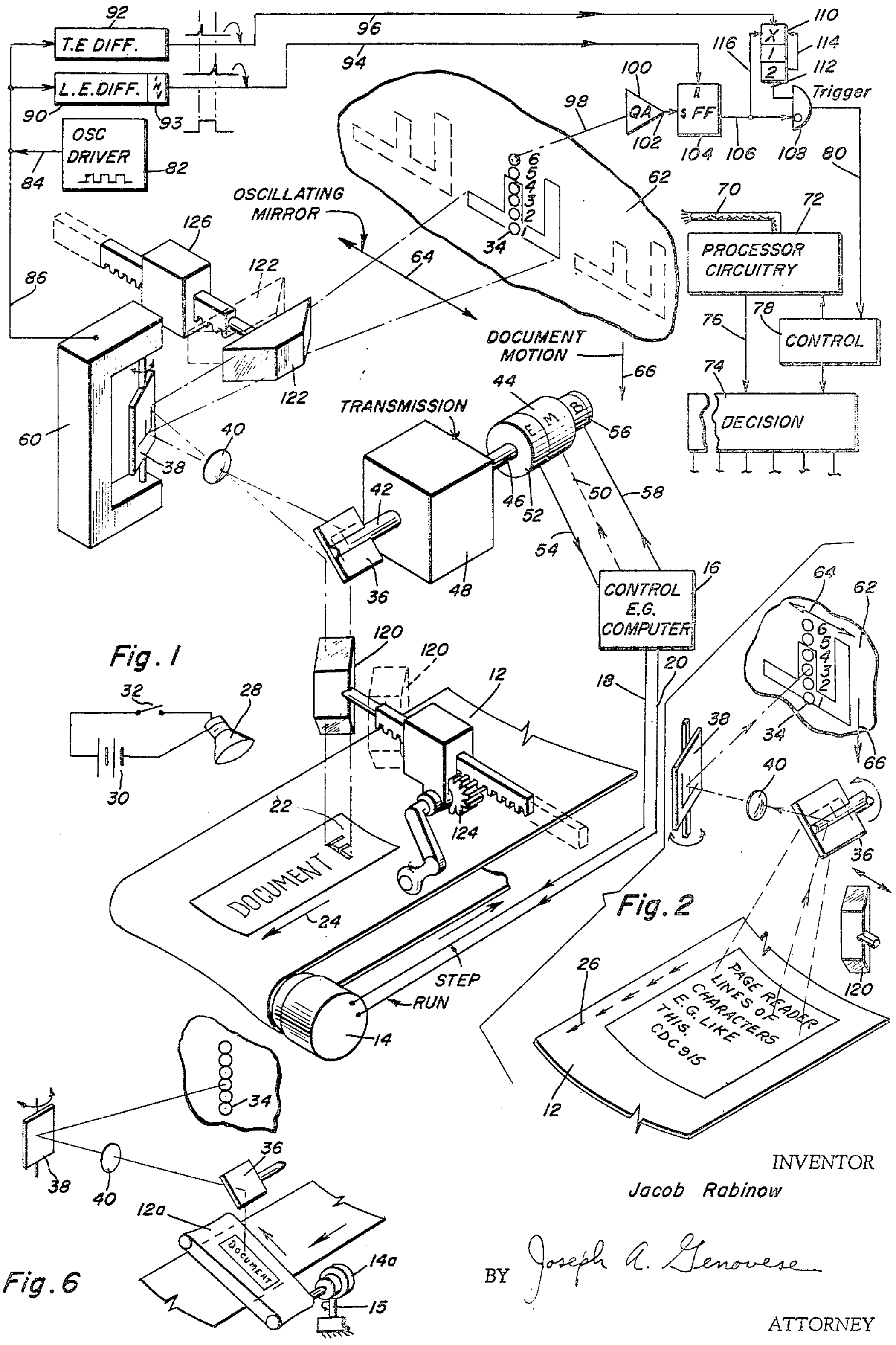
FIGURE 1 is a schematic perspective view showing a reading machine constructed in accordance with the invention and operating in the document reading mode.
FIGURE 2 is a fragmentary view like FIGURE 1, with the machine shown in the page reading mode.

FIGURE 6 is a schematic perspective view showing a further form of my invention.

In implementing my invention, there are only minor differences in the reading machine as used in the page reading mode and in the document reading mode. Accordingly, I will first describe a typical basic machine and its operation with only superficial reference to either mode of operation. These will be individually described later.

The reading machine diagrammatically shown in FIGURE 1 has a sheet mover represented by transversely curved conveyor 12 capable of being operated continuously or in a stepping mode. Motor assembly 14 under the control of computer 16 or the equivalent operates conveyor 12 in either of the two kinds of motion. Motor assembly 14 is conventional and can assume many configurations, such as a stepping motor with a wide frequency range or a stepping motor-synchronous motor combination. In either case, the small, general purpose computer 16 issues stepping motor commands over line 18, or running mode commands over line 20. The results of such commands are that a sheet to be read is moved continuously through a reading station 22, as shown by vector 24 (FIGURE 1) or stepped through the reading station as shown by the multiplicity vectors 26 (FIGURE 2).

Reading station 22 (FIGURE 1) is illuminated by light source 28, whose energizing circuit includes a power supply 30 and switch 32. An optical path is established between the illuminated reading station and scanner 34 represented by a set of photocells numbered 1–6 inclusive for identification purposes. There are mirrors 36 and 38 respectively, together with a projection lens 40 in the optical path. The illustrated prisms 120 and 122 are described later.

Mirror 36 is mounted on shaft 42 and is termed a "sweep mirror" to distinguish it from the high speed oscillating mirror 38. Shaft 42 is so positioned that the face of mirror 36 is capable of sweeping transversely across a sheet in a direction substantially parallel to the lines of characters on the sheet (see FIGURE 2). There are a number of ways to impart oscillatory motion to shaft 42. I have elected to illustrate motor 44 whose output shaft 46 is connected to a rotary-to-oscillatory movement transmission 48 of any suitable configuration. The transmission can be merely a crank and arm, a cam and follower, or any of the other classical mechanical motions capable of serving the intended purpose.

Motor 44 is under the control of computer 16 as represented by line 50. To obtain format control for reading and for other reasons, I have shaft encoder 52 attached to shaft 46, and the encoder feeds shaft position codes over line 54 to the computer 16. Thus, the computer can be programmed to sweep mirror 36 over selected portions of the sheet as it is moved through station 22. Brake 56 is attached to shaft 46 to hold the mirror 36 in any preselected angular position. To accomplish this, the computer is programmed in a manner such that shaft encoder information on line 54 is used by the computer in its issuing of stop commands over line 58 to brake 56.

The oscillating mirror 38 is a high speed device in comparison to the speed of mirror 36. Accordingly, I have schematically represented a resonant driver 60 for mirror 38. Projection lens 40 is located between mirrors 36 and 38. Therefore, an image of a character in the reading station 22 is formed on surface 62 containing the photocells of scanner 34 by light rays being reflected from the sheet onto mirror 36, and from mirror 36 through the lens 40 to the oscillating mirror 38, whose axis is at right angles to the axis of oscillation of sweep mirror 36. From mirror 38, the light rays, defining the image and its background, are directed onto surface 62. The geometry of the system is such that the image formed on surface 62 has two components of motion. The component 64 of motion caused by the oscillating mirror 38, causes the image to sweep back and forth across the photocells of scanner 34, while the component 66 of image motion is caused by movement of the sheet through the reading station (FIGURE 1) or caused by the sweeping motion of mirror 36 (FIGURE 2). At this point, it must be noted that mirror 36 is held stationary (for document reading) in the mode depicted in FIGURE 1, however, mirror 36 is swept back and forth in the reading mode depicted in FIGURE 2. Thus, the vector 66 of FIGURE 2 represents image motion caused by the sweeping if mirror 36 in FIGURE 2, while the vector 66 of FIGURE 1 represents a component of motion caused by movement of the document itself. These distinctions will be described in more detail subsequently.

The specific reading logic of my machine can be arbitrarily selected. Therefore, solely for the purpose of completeness, it can be assumed that the reading logic is like that disclosed in Rabinow U.S. Patent No. 3,201,751 or in Holt Patent No. 3,142,818 or in Rabinow et al. Patent No. 3,104,369, or in Rabinow Patent No. 3,264,469. Therefore, I have illustrated cable 70, whose lines are connected to information photocells 1–5 inclusive of scanner 34. The photocell outputs are amplified and in some configurations they are also quantized. Cable 70 is shown connected with processor circuitry 72, which interpretes the scan data or otherwise processes it is enable the decision section 74 of the reading machine to identify each character being scanned. The processor circuitry 72 can be of any conventional type (such as in the above patents) and the same is true of the descision section 74. The processor circuitry 72 and the decision section 74 are coupled by means of cable 76 and both are under the control of control section 78. In the central logic of the reading machine, the only possible sub-systems which may not be able to be directly used as disclosed in many prior patents, are the means used for developing a "read" trigger signal on line 80. Even this and other control signals can be obtained as shown in Patent No. 3,264,469. However, I have illustrated a suitable circuit at the upper and right upper part of FIGURE 1. As illustrated, the circuit is coordinated with the excursions of mirror 38 as described below.

Resonant mirror 38 is driven by an oscillator driver 82 via lines 84 and 86. A typical driving signal wave form is a square wave as shown. As the oscillating mirror is moved back and forth at least in part by the oscillator signal (in part owing to the mechanical resonance of the mirror mounting), the same signal is conducted on line 86 to leading edge differentiator 90 and trailing edge differentiator 92, which provide respective leading and trailing edge signals on lines 94 and 96. Inverter 93 changes polarity of the leading edge differential signal. The differentiator outputs, therefore, correspond to the two ends of each oscillatory excursion of mirror 38. (Alternatively, "end of sweep" signals equivalent to those on lines 94 and 96 can be obtained from shaft encoder 52 and/or computer 16 and/or exactly as disclosed in Patent No. 3,264,469.) As shown on surface 62, a single oscillation of mirror 38 will sweep the image of a character "horizontally" as represented by the dotted lines and full line images of the character "F."

The structure of the control circuit described below is designed to produce the following function. As the image of a character is swept back and forth across scanner 34, the clear space between adjacent characters is detected. In response to this detection, a "read" trigger signal is provided directly or indirectly as in the Holt Patent No. 3,303,466 where a storage and reading cycle is begun at a given condition of correlation, and a "read" trigger signal is provided independent of character spacing.

Structurally, photocell 6 of scanner 34 is a control photocell with its output signal on line 98 conducted to a quantizing amplifier 100. Amplifier 100 is designed and/or adjusted to provide an output signal on line 102 when photocell 6 experiences "darkness," i.e. when a portion of the character image is swept across the photocell. The signal on line 102 from quantizing amplifier 100 sets flip flop 104, and the output of the flip flop is conducted on line 106 to the inhibit terminal of inhibit gate 108. The output line of the inhibit gate is the previously mentioned trigger signal line 80. So far, it is evident that as the image of a character is swept back and forth across scanner 34, gate 108 will be inhibited as soon as photocell 6 detects a portion of the character image. The trailing edge signal on line 96 together with associated circuitry (described below) adds the logical requirement for a trigger signal on line 80, that photocell 6 experiences "brightness" (i.e. the character background as opposed to the character image) for more than one successive oscillation of the character image. This is accomplished in this way: The trailing edge differentiator signal on line 96 (developed at the end of each single excursion of oscillating mirror 38) is conducted to ring contour 110. The number of stages in the ring counter will correspond to the required number of oscillations of the character image being "white" on photocell 6 before a trigger signal is yielded on line 80. I have shown two stages as typical. The output line 112 of the ring counter forms an input of the inhibit gate 108. Counter 110 is automatically reset by signal fed back over line 114 when the counter steps fully to the end, and the ring counter can also be reset by a signal on line 116 anytime that there is an output from flip flop 104. I can now explain how the entire circuit operates.

The square wave (or the equivalent) signal which drives the oscillating mirror 38 has each pulse differentiated both at its leading and trailing edge. Thus, there are real time signals available for the two ends of each oscillation of mirror 38. Starting with one sweep of mirror 38, the leading edge differentiator signal on line 94 will reset flip flop 104 (if it is in the set condition) so that gate 108 is not inhibited. As the image sweeps (horizontally as shown) assume that a portion of the character image sweeps across photocell 6. There will be an output from quantizing amplifier 100 which sets flip flop 104. The flip flop output inhibits gate 108 so that no signal can pass that gate for the duration of that oscillation of mirror 38. At the end of the same oscillatory excursion of mirror 38, the trailing edge differentiator signal on line 96 will step counter 110 to the "1" position. However, owing to the standing signal on flip flop output line 106, a counter-reset signal is conducted on line 116 to reset the counter 110 to the starting position.

During the next excursion of the image (excursion of oscillatory mirror 38) assume that the character image has moved down slightly so that photocell 6 detects no portion of the character image. At the beginning of the oscillatory cycle, flip flop 104 is reset by the leading edge differentiator signal conducted on line 94. During the horizontal excursion of the image, no "set" signal is conducted to the flip flop 104, and, therefore, there is no signal on the flip flop output line 106 which would inhibit gate 108. At the end of the excursion, there is a differentiator signal on line 96 which steps counter 110 to its "1" position. Since the counter has not yet stepped to the end, no signal is conducted from the counter on line 112 to gate 108. But, during the next excursion of the image, the same procedure ensues whereby there is another trailing edge differentiator signal conducted on line 96 which steps counter 110 to its last stage. Thus, a signal is conducted on line 112 from the counter, and this passes the now non-inhibited gate 108 and is conducted as a "read" trigger signal on line 80. Counter 110 is automatically reset by signal fed back from the last stage thereof over line 114. With the advent of the trigger signal, the control circuitry 78 commands the decision section 74 to identify the character, and the reading machine is thus prepared for identifying the next character.

Attention is now directed to FIGURE 2 showing the reading machine operating in the page reading mode. In this mode, the computer 16 is programmed to cause sheet mover 12 to operate in a stepping mode (or a synchronous continuous motion mode with synchronism being between the sweep of mirror 36 and the motion of the sheet mover). The computer through its program commands motor 44 to operate and commands brake 56 to release. Thus, through transmission 48, the mirror 36 will sweep back and forth as shown in FIGURE 2. The image of the typical character "F" will appear as shown on the face of mirror 36. Projection lens 40 turns the image to the position shown on oscillating mirror 38 so that the image on surface 62 is as illustrated in FIGURE 2. With the optical system as shown, the successive images of the characters of a line of print move downwardly over surface 62 as shown by component 66, owing to the sweeping motion of mirror 36. As described before, each character image moves at a much higher speed (see component 64) back and forth across the scanner 34. In this manner, the lines of a page, or fractions thereof depending on format control dictated by computer 16, are read, i.e. the characters one after the other are identified.

Assume now that it is desired to operate the reading machine in the document reading mode. As shown in FIGURE 1, the document is turned 90° relative to a page, and the computer 16 commands the sheet mover to operate continuously rather than in an indexing or step fashion. Sweeping mirror 36 is locked in a pre-selected position by the computer program, which commands energization of brake 56. Motor 44 is de-energized, and selectivity of the angular position of mirror 36 is made possible by information from shaft encoder 52 which is fed back to the computer over line 54.

When a document is oriented in a position so that the print is turned 90° from that of the lines on a page during page reading (FIGURE 2), the images of the characters on the document will be oriented improperly on surface 62. Furthermore, where one component of scan motion was obtained by the sweeping of mirror 36 (FIGURE 2) the same mirror is stationary in the document reading mode. The motion of the document itself is relied on to provide a corresponding component of scan motion. Thus, although there is a great similarity of means for page and for document reading, there is a great operational difference therebetween.

In order to have the images of the characters in the reading station 22 oriented on surface 62 in the same manner as the characters on the same surface during the page reading mode of operation, I use optical means for turning the images. The simplest form of optical means are dove prisms 120 and 122 (FIGURE 1). Prism 120 is located between the document and mirror 36, and it rotates the image reaching the mirror 90° and also provides a mirror image of it. Lens 40 again rotates the image, 180°, while prism 122 located between the oscillating mirror 38 and surface 62 provides a mirror image, rotated 180°. Thus, the scanner and all of its associated circuitry detect no difference originating from the methods of presentation of reading material, e.g. as in FIGURE 1 or in FIGURE 2.

Prism 120 and 122 are used for document reading, and they are withdrawn from the optical path during the page reading mode. The insertion and withdrawal of the prisms can be under computer control. However, I have elected to show a mechanical means to accomplish this, i.e. rack and pinion assemblies 124 and 126 to which the prisms are fastened. It is obvious that the mechanical means for the two prisms can be mechanically coupled by belts, chains, etc. thereby requiring only operation of one knob or handle to simultaneously insert or withdraw the two prisms.

FIGURES 3–4*a* show another form of my invention wherein only one dove prism is required. There are advantages and disadvantages inherent in eitther embodiment. In the configuration shown in FIGURES 3–4*a*, prism 130 remains in the optical path at all times, and this has the advantage of being able to maintain precise optical lengths. Thus, it is mounted in a holder 132 (FIGURE 3*a* and FIGURE 4*a*) within a fixed barrel 134. By using handle 136, the prism can be rotated from the document reading position shown in FIGURE 3*a* to the page reading position shown in FIGURE 4*a* by turning the prism holder 132 between the stop 140 and 142 which are positioned to allow the prism to be rotated 45°.

In the document reading mode (FIGURES 3 and 3*a*) the images shown on the various reflecting surfaces accurately portary the optics involved. Prism 130 in the document reading position (FIGURE 3*a*) provides a mirror image of the "F" and rotates the image 90° owing to the rotational position of the prism. However (FIGURE 4 and FIGURE 4*a*) when the reading machine is in the page reading mode, prism 130 is turned to the position shown in FIGURE 4*a*. In that position the prism provides a mirror image of the "F," rotated 180°. These rotations are correct in requiring the examined images on surface 62 to be the same for the document and for the page reading function since the characters on the sheets as presented to the reading station of the machine, are 90° rotated with respect to each other.

Attention is directed to the embodiment of FIGURE 5 which shows that with a simple logic network between scanner 34 and processor circuits 72, I can combine an electronic and optical solution to the problem of converting easily between page and document reading modes in a typical reading machine. The embodiment of FIGURE 5 contemplates the use of a single prism identical in all respects to prism 120 in FIGURE 2. In the page reading mode prism 120 is withdrawn from the optical path as shown in FIGURE 2 and the images of the characters on surface 62 are as shown in FIGURE 2.

For the document reading mode, prism 120 (only) is inserted into the optical path. In the absence of prism 122 (FIGURE 1), the images of the characters on surface 62 (FIGURE 1) will appear upside down, i.e. rotated 180°. In FIGURE 1, prism 122 corrects this optically. In the embodiment of FIGURE 5 I make a 180° correction, but I do it electronically at a convenient place within the machine, namely between the scanner 34 and the circuits 72. (The means which are largely gates can be considered as part of processor circuits 72). The 180° electronic correction is accomplished by simply gating the scanner outputs into the circuits 72 (represented by shift register 72*a*) in an inverted manner as described below, which is very much like that in Patent No. 3,264,-469.

Information photocells 1–5 (FIGURE 5) have their output signals amplified at 150 and conducted on lines 152–160 through the strobed gates 161. These lines are divided to form respective inputs to two sets of inhibit gates 162 and 164. The inhibit terminals of the sets of gates are connected to inhibit buses 166 and 168 which are driven by binary flip flop 170. Thus, either one set or the other of inhibit gates is inhibited depending upon the state of flip flop 170.

The output lines 174 of gates 162 and the output lines 176 of the other set of gates 164 are OR gated at 180 ahead of the input terminals of register 72*a*. Lines 174 and 176 are so arranged (as shown) that photocell No. 1 has its signal conducted to either stage 1 or stage 5 of register 72*a* depending upon the state of flip flop 170, i.e. depending upon which set (162 or 164) of gates is inhibited. In a like manner the output of photocell No. 2 is gated to either stage 2 or stage 4 of the register. Since photocell No. 3 is always the center cell it needs no directional change. The outputs of photocells 4 and 5 are slectively conducted to stages 4 or 2, and 5 or 1 respectively. Thus, for the page reading mode there is a direct application of data (gates 164 are inhibited) from the scanner to register 72*a*. For document reading, although the optical image is rotated 180° from that shown in FIGURE 2 for page reading, the electronic representation thereof in register 72*a* will be rotated 180° owing to the inhibiting of gates 162 and the "opening" of gates 164. To switch between sets of gates, it is only neceessary to actuate flip flop 170 by a signal on the set line 171.

Attention is now directed to FIGURE 6 showing another form of my invention. The scanner 34, lens 40, mirrors 36 and 38 and sheet mover 12 are the same as in FIGURES 1 and 3. In lieu of prism 130 or the pair 120 and 122, I have a second sheet mover **12*a* designed to move documents at right angles to the movement of pages by sheet mover 12**.

Sheet mover **12*a* is schematically shown as a conveyor located above and transverse to sheet mover 12. The conveyor is driven by motor 14*a*. As illustrated motor 14*a* and the conveyor are mounted by pivot 15 on the frame of the machine so that sheet mover 12*a* can be swung to an inoperative position when the machine is used in the page reading mode. The document reading procedure of the machine of FIGURE 6 is the same as in FIGURE 3, except that prism 130 is omitted as being unnecessary. The proper direction and orientation of the images of the characters on the document is obtained by using the document feeder 12*a* (oriented as shown) in place of the feeder 12**.

I have indicated that documents read by my machine may have more than one line of characters. Usually, they have only a single line which is machine-readable. If they have more than a single line, they can be passed through the machine once for each line of characters to be read. Registry can be obtained by the feed location and/or by appropriate adjustment of mirror 36. Alternatively, other methods can be used such as duplicating the optical and scanning systems, i.e. one for each line to be read. These and other means are not essential to my invention, and so they are only briefly mentioned.

It is understood that numerous changes may be made without departing from the protection of the following claims.

I claim:

1. In an optical character reading machine having a sheet handler, a photosensitive scanner to examiner the characters and provide outputs corresponding thereto, and means responsive to said outputs for providing character-identity signals; an improvement enabling said machine to function as a page reading machine wherein the pages each contain at least one line of characters which are oriented in a first direction as the pages are handled by said sheet handler, and selectively to function as a document reading machine wherein the documeans handled by said sheet handler contain at least one line of characters arranged transverse to the orientation of the lines of said pages, said improvement including a light ray deflecting member, means for moving said member in a manner to sweep an optical path lengthwise of a line of characters on a said page and provide successive images of the characters oriented in a first direction for presentation to said scanner while said machine is operative in the page reading mode, means for holding said member in a fixed position when said machine is operative in the document reading mode, said sheet handler moving the document to provide for effective sweeping motion as the line of characters is so moved past said deflecting member, and optical means interposed in the optical path between the document and said scanner to orient the images of the line of characters when the machine is operative in one mode to an orientation similar to the images of the characters when the machine is in the other mode so that all character images are similarly presented to said scanner.

2. The reading machine of claim 1 and means for adjusting said optical means for one of said reading modes and for adjusting said optical means for the other of said reading modes.

3. The reading machine of claim 1 and means having a reflective surface in said optical path for oscillating the images of the characters in a direction transverse to their direction of motion over said scanner to provide for registry tolerance of the images with said scanner.

4. The reading machine of claim 1 wherein said optical means include a prism.

5. The reading machine of claim 4 and means to rotate said prism to selected position for the selected reading modes.

6. The reading machine of claim 4 and means for moving said prism into and from said optical path for the selected reading modes.

7. In an optical character reading machine having a reading station a sheet mover to move a sheet having lines of characters thereon into said staiton in a manner such that the lines are either transverse to the direction of sheet motion or selectively substantially parallel to said direction of motion, a light ray deflecting member at said station, means to move said member in a manner to sweep successively images of the characters of a line transverse to said direction thereby providing one component of scan motion, a scanner in optical alignment with said member and over which said images are swept means for holding said member in a fixed position when the sheet is moved in a manner such that it has the line of characters parallel to the direction of sheet motion so that the motion of the sheet provides one component of scan motion, optical means to orient the character images, means for retaining said optical means in selected positions depending upon the orientation of the lines of characters presented at said reading station so that the orientation of the images of the individual characters formed on said scanner is the same regardless of whether the lines of characters on the sheets are parallel or transverse to the direction of sheet motion.

8. In an optical character reading machine having a reading station, a sheet mover to move a sheet having lines of characters thereon into said station in a manner such that the lines are either transverse to the direction of sheet motion or selectively substatnially parallel to said direction of motion, a light ray deflecting member at said station, means to move said member in a manner to sweep successive images of the characters of a line transverse to said direction thereby providing one component of scan motion, a scanner in optical alignment with said member and over which said images are swept, means for holding said member in a fixed position when the sheet is moved in a manner such that it has the line of characters parallel to the direction of sheet motion so that motion of the sheet provides one component of scan motion, optical means to orient the character images, means for retaining said optical means in selected positions depending upon the orientation of the lines of characters presented at said reading station, and electronic means responsive to the outputs of said scanner for processing said outputs in a manner such that a further correction is electronically made to compensate at least in part for the difference in said orientations of characters presented at said reading station.

9. In an optical character reading machine having a scanner; sheet moving means to transport sheets in a first reading mode wherein a typical line of characters on said sheets is oriented normal to the direction of sheet motion, and selectively in a second reading mode where a typical line of characters is oriented parallel to the direction of sheet motion; means defining a reading station through which the sheet is moved; a scanner; means establishing an optical path between said reading station and said scanner; and processor means responsive to the scanner outouts to identify the characters; the improvement comprising optical means for adjusting the image orientations of characters appearing on said scanner to compensate for image rotation caused by the different orientation of characters on the sheets as presented at said reading station during the first and the second reading modes; and means for adjusting the position of said optical means.

10. The subject matter of claim 9 wherein said optical means provide a partial correction of image orientation; and electronic means to process said scanner outputs in a manner to provide a further correction by electronic processing of said outputs ahead of the identification of the characters.

11. The subject matter of claim 10 wherein said first reading mode is a page reading mode, and said second reading mode is a document reading mode.

References Cited

UNITED STATES PATENTS

| | | | |
|---|---|---|---|
| 3,170,138 | 2/1965 | Buckingham | 340—146.3 |
| 3,196,395 | 7/1965 | Clowes | 340—146.3 |
| 3,205,367 | 9/1965 | Whitesell | 250—235 |
| 3,206,725 | 9/1965 | Fitzmaurice | 340—146.3 |
| 2,222,937 | 11/1940 | Dimmick | 178—7.6 |

MAYNARD R. WILBUR, Primary Examiner

L. H. BOUDREAU, Assistant Examiner.

U.S. Cl. X.R.

178—7.6; 250—235